INVENTOR.
DONALD D. SMITH.

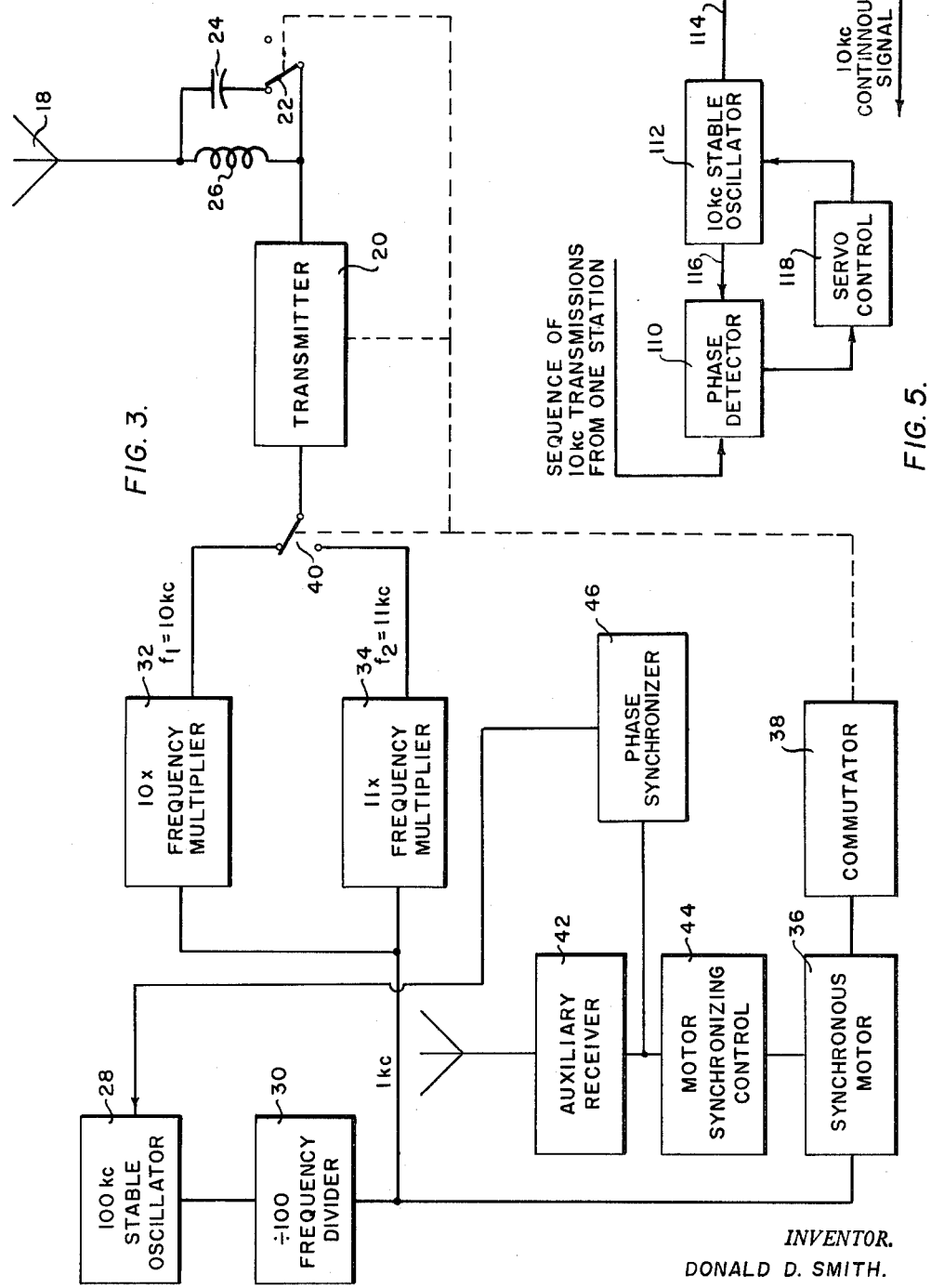

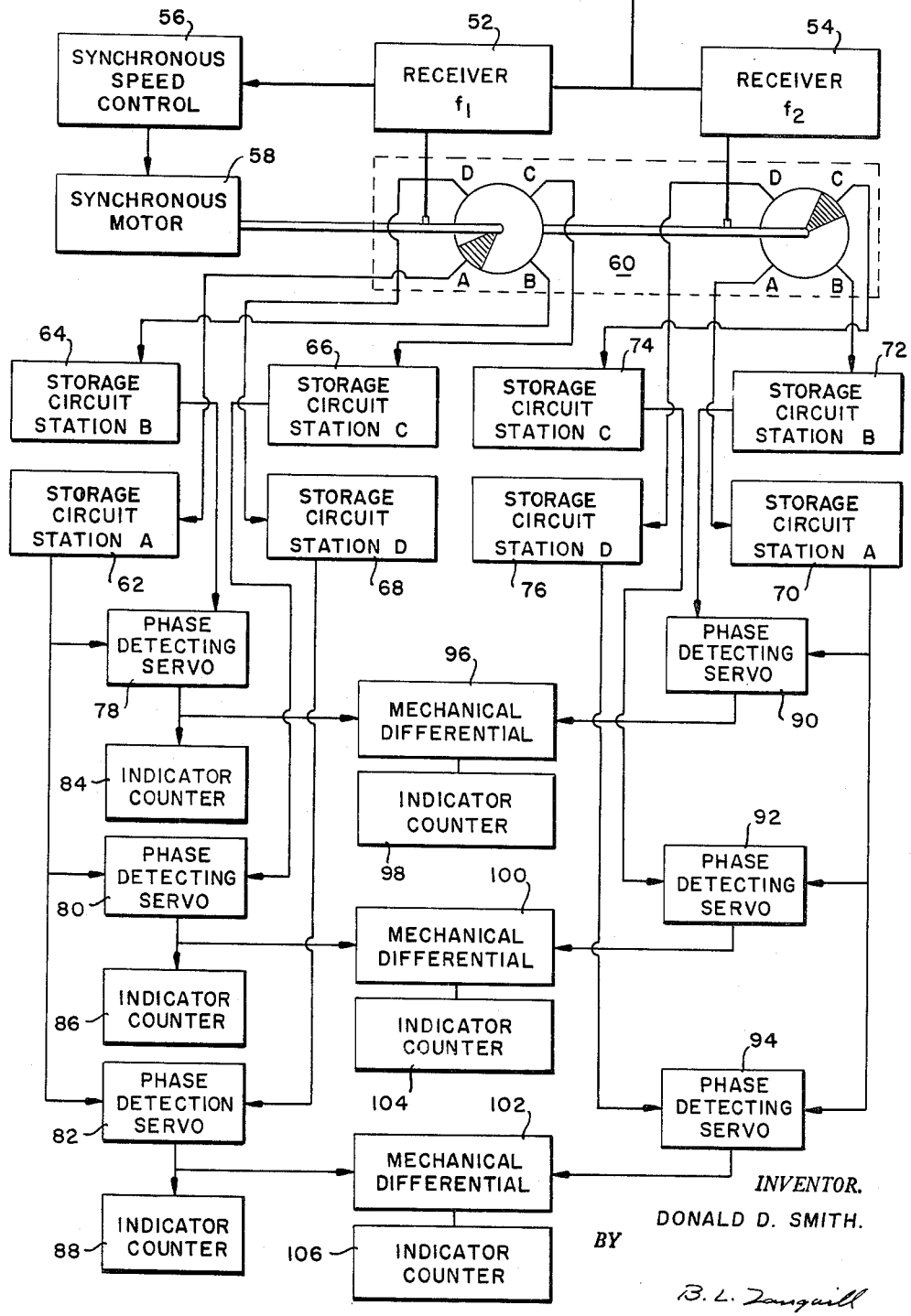

United States Patent Office 3,209,356
Patented Sept. 28, 1965

3,209,356
VLF LONG RANGE NAVIGATION SYSTEM WITH-
OUT SIGNIFICANT AMBIGUITIES
Donald D. Smith, 2120 Hermitage Ave.,
Silver Spring, Md.
Filed May 28, 1959, Ser. No. 816,651
7 Claims. (Cl. 343—105)
(Granted under Title 35, U.S. Code (1952), sec. 266)

The invention described herein may be manufactured and used by or for the Government of the United States of America for governmental purposes without the payment of any royalties thereon or therefor.

This invention relates to a very low frequency, long range navigation system without significant ambiguities for use by submerged submarines, surface craft, and aircraft.

The object of the system is to provide users of suitably constructed receiving and phase measuring equipment their geographic position, without significant ambiguities, in terms of the phase lines-of-position within the coverage area of suitably located and synchronized transmissions from VLF shore stations.

Previous systems such as standard loran, radux and cytac have range limitations of the order of 700 to 3000 miles. Further, only the radux system provides navigation information to submerged submarines and then only to submerged depths of 5 to 10 feet. The system described herein should provide coverage up to 6000 miles from the farthest shore station of a triad and to submerged depths of the order of 50 feet.

A VLF system such as that proposed by the Decca Navigator Company, called Delrac, required very high power transmissions on several different frequencies from the same station in order to lessen the ambiguities to tolerable limits and is considered wasteful of the frequency spectrum. Further, simultaneous transmission on several frequencies from the same station poses many problems from the antenna tuning viewpoint. Use of multiple frequencies in the navigation receiver complicates this unit to a very great extent and presents serious phase stability problems in the R.F. sections of the receiver. Decca also proposed to use relatively short baselines in the Delrac system in order to minimize synchronization error which results in relatively high geometrical degradation of the line-of-position as the distance from the baseline between stations approaches 3–4 times the baseline length.

In accordance with the present invention, the transmitting part of the system comprises a number of special VLF transmitters, transmitting alternately on two frequencies, to cover the area in which navigation coverage is desired. The minimum number of stations to provide two intersecting hyperbolic phase grids is three. The maximum number is determined by the amount of information required per unit time, since all stations will be sharing time on the same frequency, and the total area to be covered by one network of stations.

In accordance with the present invention, the receiving part of the system, which is mounted on the submarine or other mobile craft, comprises a pair of receivers tuned to the two frequencies sent out by the transmitters, a commutator connected to the receivers for separating the signals from the various transmitters, a plurality of storage devices connected to the commutator to store the signals and their phase relationship, and a plurality of phase detector servos and differentials to measure the phase differences between the signals and thereby establish the craft's position on a hyperbolic grid system.

Another object of this invention is to use the phase difference between two signals of the same frequency transmitted at different times from different transmitters to establish Fine lines-of-position on a hyperbolic grid system.

Another object of this invention is to use the phase difference between the phase difference of signals on two frequencies transmitted from a plurality of transmitters to establish Coarse lines-of-position superimposed on a Fine line hyperbolic grid system to resolve ambiguities in the Fine lane system.

Other objects and advantages of the invention will hereinafter become more fully apparent from the following description of the annexed drawings, which illustrate a preferred embodiment, and wherein:

FIG. 3 is a schematic diagram of a transmitting station;

FIG. 4 is a schematic diagram of a receiving set; and

FIG. 5 is a schematic diagram of a typical storage circuit.

Figure 1:
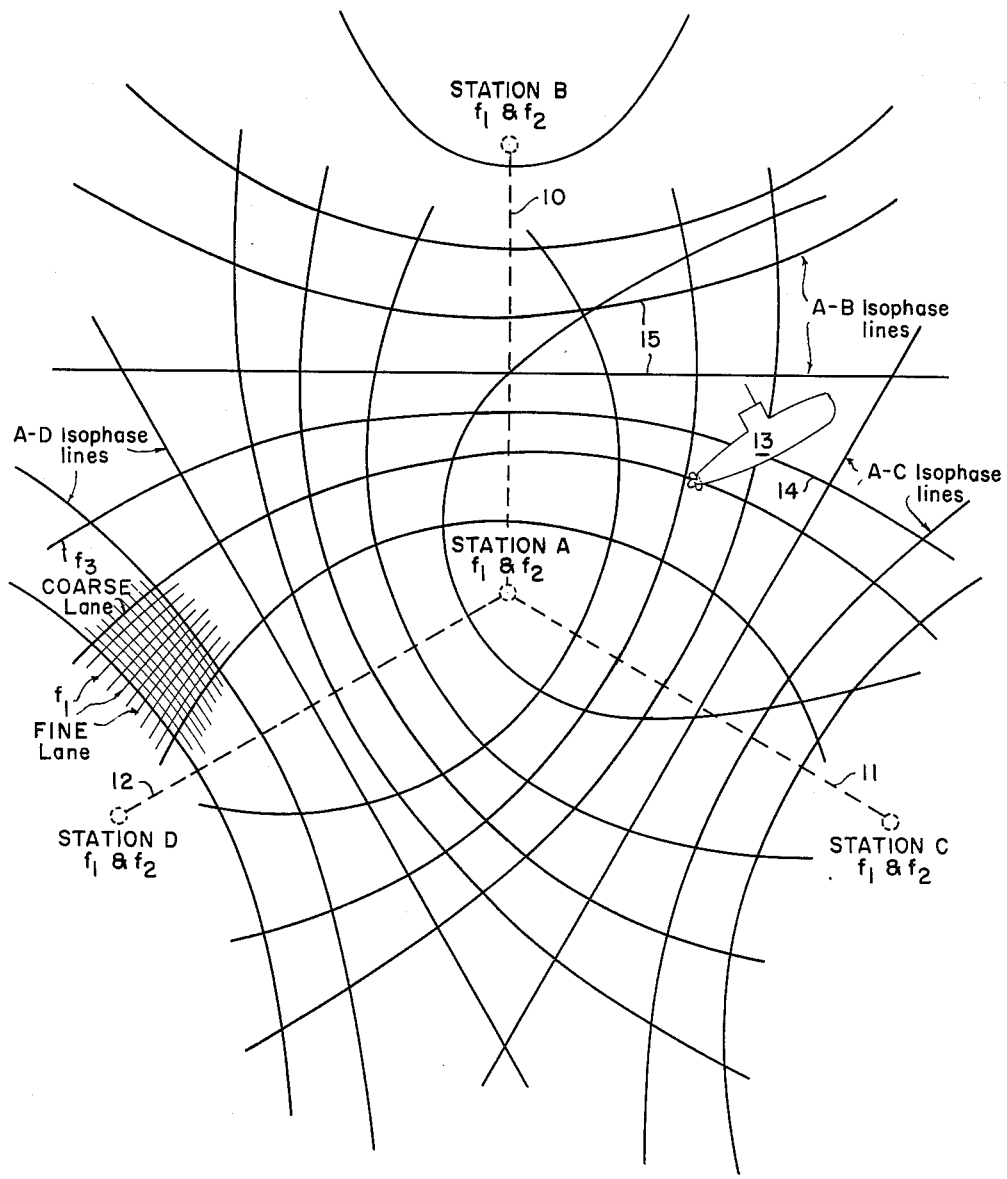
FIG. 1 is a view of the possible locations of a plurality of transmitters with the isophase, hyperbolic lines-of-position.

Referring now to the drawings, wherein like reference characters designate like or corresponding parts throughout the several views, there is shown in FIG. 1, which illustrates a preferred embodiment, an installation of four transmitting stations A, B, C, and D which transmit sequentially on frequencies $f_1$ and $f_2$. Baselines AB (numeral 10), AC (numeral 11), and AD (numeral 12) may be in the order of 5000 miles long and therefore world-wide coverage may easily be provided by a relatively few stations.

Stations A, B, C and D transmit sequentially on two very low frequencies $f_1$ and $f_2$, such as 10 and 11 kilocycles/second, so that submarines which are submerged to a depth of 50 feet below the surface of the water may navigate successfully.

The phase difference between a signal such as one received on a submarine 13 from station A and a second synchronized signal received from station B on the same frequency $f_1$ establishes the receiver on an isophase hyperbolic line 14 about the baseline between stations A and B. These isophase lines repeat every 360 degrees of phase change produced by traversing a distance equal to one-half the wavelength of the frequency $f_1$. However, since the width between isophase lines is a function of frequency, the distance 15 between repetitive isophase lines, hereafter called "lanes," becomes smaller as the frequency is increased. The repetition of these phase lines-of-position creates ambiguities in the position of the navigation receiving equipment. Assuming 3.6 degree accuracy of phase measurement 95% of the time in the $f_1$ fine lane system, the ultimate accuracy in measuring a line-of-position on the baseline at 10 kc. is of the order of 480 feet, neglecting vagaries in propagation. This figure is obtained by multiplying 3.6 deg. accuracy/360 deg. per fine lane×8 mi. per fine lane×6000 ft./naut. mi.=480 feet.

When phase lanes are produced on two frequencies separated by $f_1-f_2=f_3$, the isophase lines on each frequency coincide when a distance is traversed equal to the wavelength of $f_3$. This means that the phase difference between the phase differences in each channel changes 360 degrees when a distance of the wavelength at the $f_3$ coarse lane frequency is traversed on a baseline. In practice, this coarse phase difference would be obtained through the use of a mechanical differential and $f_3$ would become a phantom frequency which existed for explanation purposes only. Since the phase differences between signals on $f_1$ are obtained in one channel and the phase differences between the signals on $f_2$ are obtained in another channel, the signals in each channel experience the same phase delay and consequently their phase difference is unaffected by variations in phase delay in their respective channels.

If the random error of the $f_3$ coarse lane phase difference is small enough and the ratio between $f_1$ and $f_3$ is small enough, the phase position in the $f_3$ coarse lane permits the selection of the correct $f_1$ fine lane. With state of the art phase measurement at VLF and proper integrating techniques, ratios of the order of 10 to 30 should be practicable between $f_1$ and $f_3$. This means that a coarse lane on the baseline would be 80 to 240 miles in width at a frequency of 10 kc.

Figure 2:
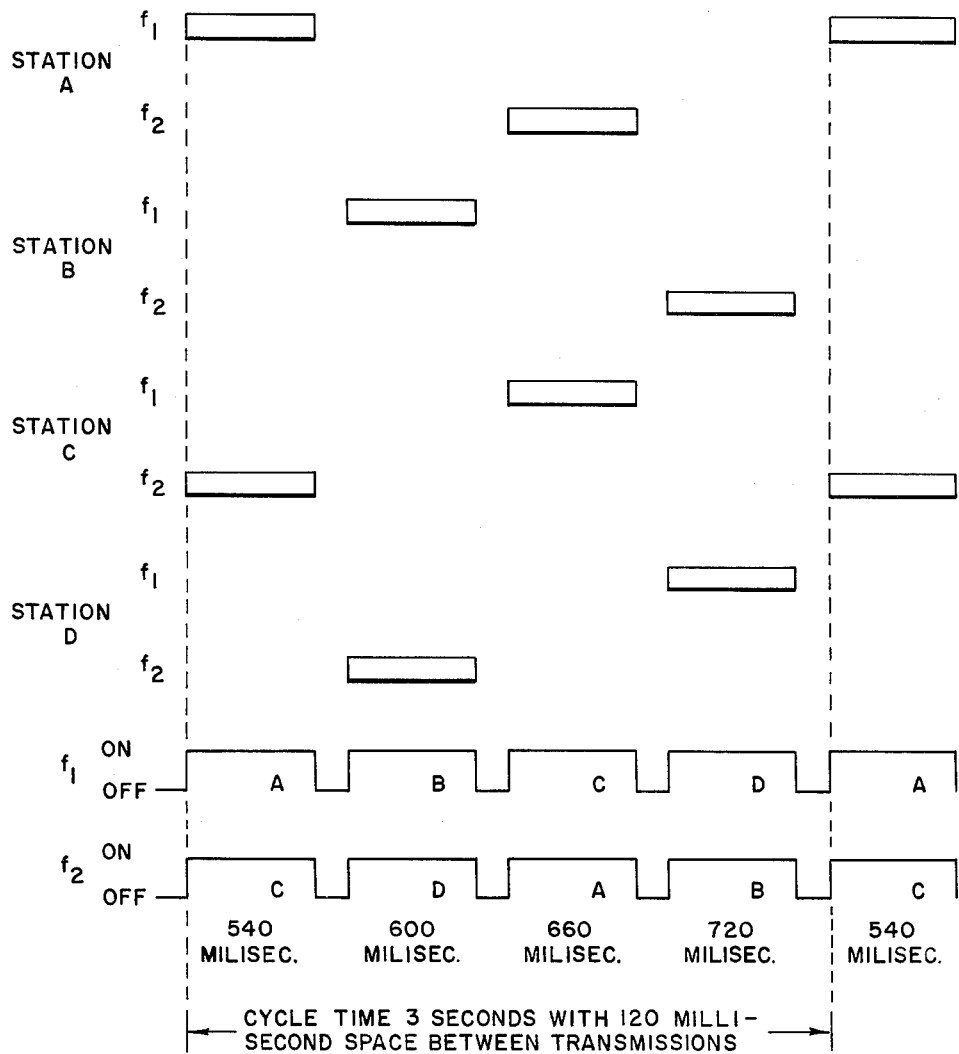
FIG. 2 shows a typical sequence of transmissions of from four transmitting stations on two frequencies.

As the user of the system moves off the baseline, the width of the coarse lane becomes greater. Coarse lane widths of this magnitude are considered sufficiently large to allow resolution by simple dead-reckoning techniques. Referring to FIG. 2, a typical time and frequency sequence of transmissions from the four stations A, B, C and D is shown for a three second cycle time with 120 milliseconds between transmissions. During the first 540 milliseconds time interval of a 3 second sequence, transmissions would emanate from station A on frequency $f_1$, and from station C on $f_2$, stations B and D being silent. During the second 600 millisecond time interval of the same 3 second sequence, transmissions would emanate from station B on frequency $f_1$ and from station D on frequency $f_2$, stations A and C being silent. During the third 660 millisecond time interval of the same 3 second sequence, transmissions would emanate from station A on frequency $f_2$ and from station C on frequency $f_1$, stations B and D being silent. Finally during the last 720 millisecond time interval of the same 3 second sequence, transmissions would emanate from station B on frequency $f_2$ and on frequency $f_1$ from station D, stations A and C being silent. This sequence is repeated every 3 seconds during the time the shore network is operating normally. This time sequence of transmissions is utilized in the navigation receivers 52 and 54, for synchronization of the channel commutator 60 to assure separation of the signals in the proper storage circuits, 64, 66, 74, 72, 62, 68, 76, and 70 of FIG. 4.

Referring to FIG. 3, a schematic diagram of one transmitter is shown where $f_1$ and $f_2$ are transmitted from a single antenna 18 driven by a single transmitter 20. Transmission on two closely related frequencies from a single antenna is provided by an antenna switch 22 which connects capacitor 24 across antenna loading coil 26.

Transmitter 20 may be a broad band, VLF transmitter, Type AN/FRA–31, developed by the Westinghouse Electric Corp., Pittsburgh, Pa., for the Radux navigation system.

The reference frequency source for the system is a 100 kilocycle/second oscillator 28 which easily may be made stable to a few parts in $10^9$ per day. A $\div 100$ frequency divider 30 connected to oscillator 28 provides a 1 kilocycle reference to 10× frequency multiplier 32 for $f_1 = 10$ kc. and to 11× frequency multiplier 34 for $f_2 = 11$ kc.

In order to transmit $f_1$ and $f_2$ in the proper sequence over antenna 18, a synchronous motor 36 controlled from stable source 28 through frequency divider 30 drives a commutator 38 which operates switch 40, changes the tuning on transmitter 20, and operates antenna switch 22 in accordance with the sequence shown on FIG. 2. In order to synchronize transmissions from all of the transmitting stations in the sequence shown in FIG. 2, an auxiliary receiver 42 tuned to $f_1$ or $f_2$ and motor synchronizing control 44 connected to motor 36 is used to set the timing of commutator 38. If the stable frequency sources 28 for all of the plurality of transmitters were infinitely stable, then no appreciable drift of the isophase, hyperbolic lines-of-position would occur which would affect the navigation accuracy. However, since available sources are stable to only a few parts in $10^9$ per day, an auxiliary phase synchronizer 46 connected to auxiliary receiver 42 slightly adjusts the frequency (or phase) of the 100 kc. oscillator 28 to maintain the phase synchronization of the oscillator 28 with respect to the plurality of transmitters.

Referring to FIG. 4, the receiving part of the system, which is mounted on a submarine or other craft, is shown having broad band antenna 50, and receivers 52 and 54 for receiving $f_1$ and $f_2$ respectively.

A synchronous speed control 56 connected to receiver 52 synchronizes motor 58 to drive commutator 60 which selectively connects receiver 52 to storage circuits 62, 64, 66 and 68 for stations A, B, C, D and receiver 54 to storage circuits 70, 72, 74 and 76 to decode the sequence of transmissions illustrated on FIG. 2 for stations ABCD respectively.

Phase detecting and measuring servos 78, 80, and 82 are connected between station A storage circuit 62 and circuits 64, 66, and 68 to measure the phase difference between signals transmitted on $f_1$ from the four stations.

Indicator-counters 84, 86 and 88 are connected to servos 78, 80 and 82 respectively to indicate each Fine line-of-position for AB, AC, and AD and to count the Fine lanes that the craft passes through.

In order to determine the Coarse lines-of-position of Fine lines on the two different frequencies, phase detecting and measuring servos 90, 92 and 94 are connected between storage circuit 70 and storage circuits 72, 74 and 76 respectively. The outputs of servos 90 and 78 are connected by a mechanical differential 96 to an indicator-counter 98 which indicates the phase position of the receiver and counts the coincidences between isophase lines on $f_1$ and $f_2$ to establish Coarse lines-of-position for the AB transmitters.

Similar differentials 100 and 102 and indicator-counters 104 and 106 establish Coarse lines-of-position for AC and AD transmitters.

The purpose of the storage circuits in the mobile or ship-borne receiver is to provide the phase detecting servos with continuous signals of constant amplitude and slowly varying phase, the continuous signal phase corresponding to the average phase of each pulsed signal received in the transmission sequence.

As shown in FIG. 5, which shows a typical storage circuit, a sequence of 10 kc. transmissions from one station as selected by the commutator 60 is applied to a phase detector 110. A 10 kc. stable oscillator 112 has one 10 kc. output 114 which is applied to the phase detecting servos and a second 10 kc. output 116 applied to the phase detector 110. The phase detector 110 has an output proportional to the difference in phase between the 10 kc. sequence and the 10 kc. output 116 from oscillator 112, which detector 110 output is applied to a servo control 118 which adjusts oscillator 112 so that its output 114 to the phase detecting servos has a constant amplitude and is equal in phase to the average phase of the transmission sequence.

The storage circuits thus provide a continuous, constant amplitude signal to the phase detecting servos which is equal in phase to the average phase of the transmission sequence from each of the transmitting stations.

In operation, the mobile craft or submarine 13 has its position determined by dead reckoning or celestial navigation to within 80 to 240 miles, or more if the craft is away from the base line. The receiving unit then will indicate the position of the ship by measuring and indicating the phase angles on the indicator-counters, to determine the craft's position by means of the Coarse and Fine lines-of-position.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A VLF long-range navigation system for providing location information to mobile craft, comprising:
   (a) a plurality of transmitting stations for establishing isophase, hyperbolic lines-of-position;
   (b) each of said transmitting stations having a transmitter, a first frequency source, a second frequency source and a transmitter switching means for sequentially connecting said first frequency source and said second frequency source to said transmitter;
   (c) said transmitter switching means controlling said transmitting stations such that no two transmitting stations are transmitting the same frequency at the same time;
   (d) a receiver station for receiving signals from said transmitting stations and determining therefrom the position of said receiver with respect to said transmitting stations;
   (e) said receiver station comprising means for receiving said transmitted signals, means for storing phase information from said transmitted signals, means for measuring the phase difference between signals of the same frequency to establish Fine isophase lines-of-position, and means for comparing the phase differences of the Fine isophase lines-of-position to determine Coarse lines-of-position, whereby ambiguities in said Fine lines-of-position are resolved.

2. A VLF long-range navigation system for providing location information to mobile craft, according to claim 1, in which each of said transmitting stations further comprise:
   (a) a third stable-frequency source;
   (b) a first multiplier means connected to said third stable-frequency source for energizing said first frequency source;
   (c) a second multiplier means connected to said third stable-frequency source for energizing said second frequency source;
   (d) wherein said first frequency source and said second frequency source are so related that only one radio frequency channel is required for their transmission.

3. A VLF long-range navigation system for providing location information to mobile craft, according to claim 1, in which said means for storing phase information comprises:
   (a) a distributor;
   (b) a plurality of oscillators;
   (c) means for phase locking said oscillators to said signals from said transmitting stations;
   (d) said distributor sequentially connecting said received signals from said transmitting stations to said means for phase locking said oscillator, whereby said oscillators retain the phase of said received signals; and
   (e) synchronizing means for synchronizing said distributor with the sequence of signals from said transmitting stations.

4. A VLF long-range navigation system for providing location information to mobile craft, according to claim 3, in which said means for comparing the phase differences of the Fine isophase lines-of-position includes a coincidence detector.

5. A VLF long-range navigation system for providing location information to mobile craft, according to claim 4, in which said means for measuring the phase difference between signals of the same frequency includes:
   (a) a phase detecting servo; and
   (b) an indicator counter;
   (c) the output from said phase detecting servo providing the input to said indicator counter and one input to said means for comparing the phase differences of the Fine isophase line-of-position.

6. A VLF long-range navigation system for providing location information to mobile craft, according to claim 5, in which said means for comparing Fine isophase line-of-position includes a mechanical differential.

7. In a VLF long-range navigation system having a plurality of transmitting stations for sequentially transmitting signals which establish isophase, hyperbolic line-of-position for providing location information to mobile craft, a receiver comprising:
   (a) means for receiving said transmitted signals;
   (b) a distributor;
   (c) a plurality of oscillators;
   (d) means for phase locking said oscillators to said signals from said transmitting stations;
   (e) said distributor sequentially connecting said received signals from said transmitting stations to said means for phase locking said oscillator, whereby said oscillators store the phase of said received signals;
   (f) synchronizing means for synchronizing said distributor with the sequence of signals from said transmitting stations;
   (g) means for measuring the phase difference between signals of the same frequency to establish Fine isophase lines-of-position; and
   (h) means for comparing the phase differences of the Fine isophase lines-of-position to determine Coarse lines-of-position, whereby ambiguities in said Fine lines-of-position are resolved.

References Cited by the Examiner

UNITED STATES PATENTS

| Re. 24,891 | 10/60 | Palmer | 343—105 |
| 2,652,561 | 9/53 | Hawkins | 343—105 |
| 2,890,452 | 6/59 | Rohrback | 343—105 |

OTHER REFERENCES

J. A. Pierce: "Radux," Cruft Lab., Harvard University, Cambridge, Mass., Tech. Rep. No. 17, July 1947.

Aviation Week, Nov. 11, 1957, pp. 83, 85 and 87 relied on.

"Electronic Aviation Engineering" (Sandretto), pub. by International Telephone and Telegraph Corp. (New York), 1958, pp. 179–181 relied on.

IRE Proceedings, May 1959, pp. 829–835 relied on.

International Civil Aviation Organization, Report of the Sixth Session, Communications Div., vol. II, November 1957, pp. VII–182 to 184 relied on.

CHESTER L. JUSTUS, *Primary Examiner.*